United States Patent Office.

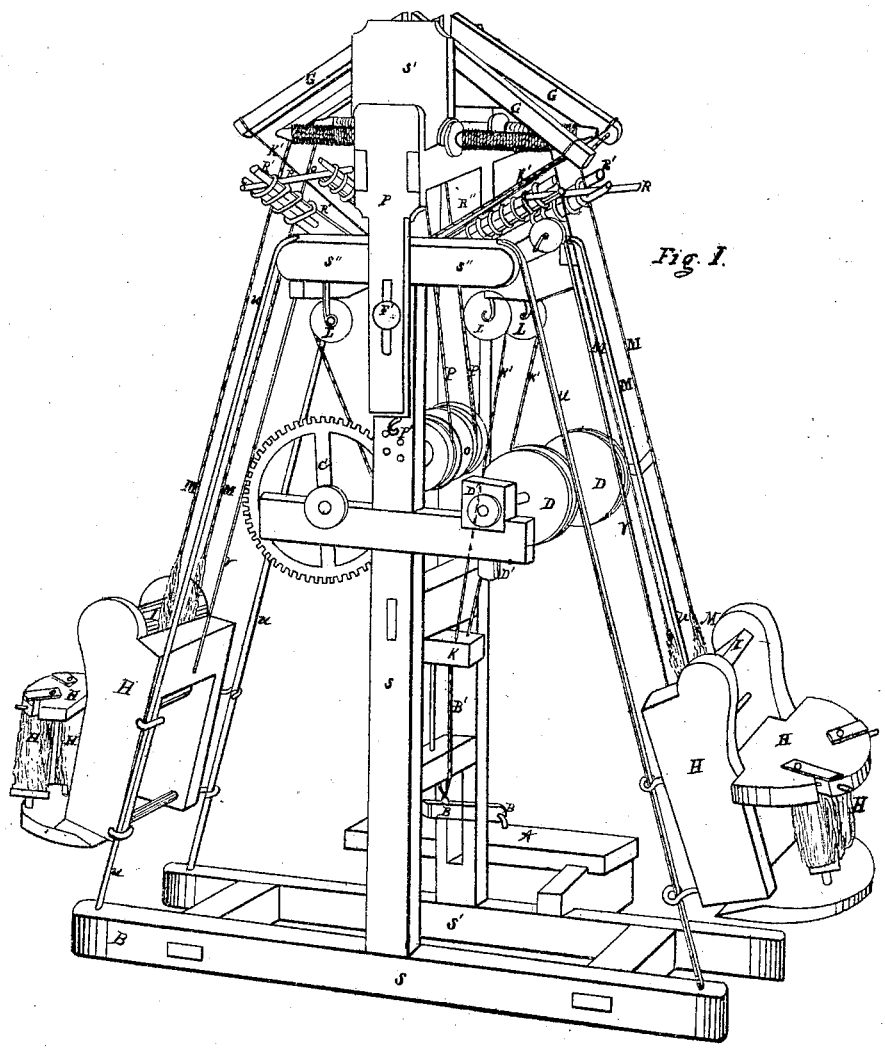

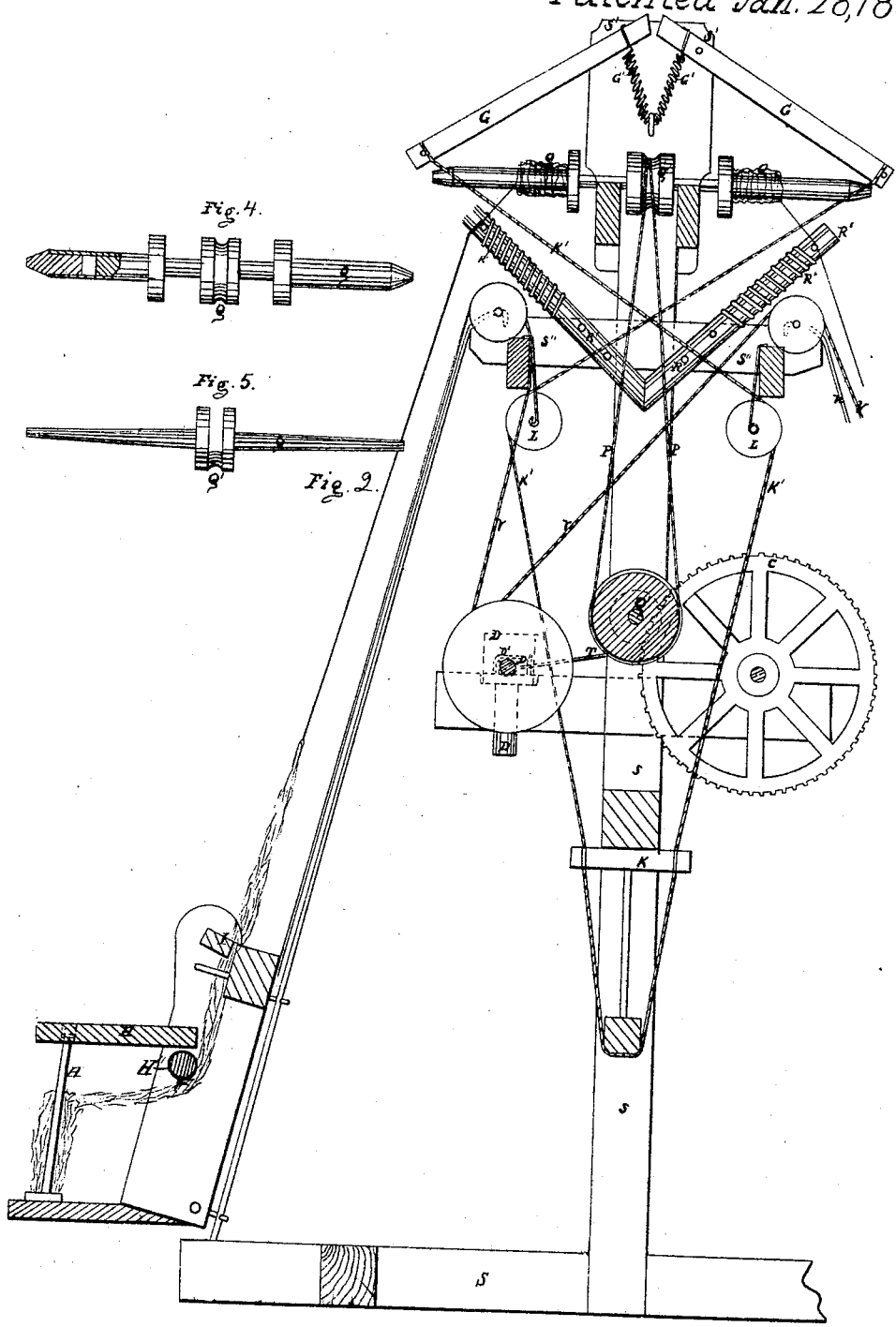

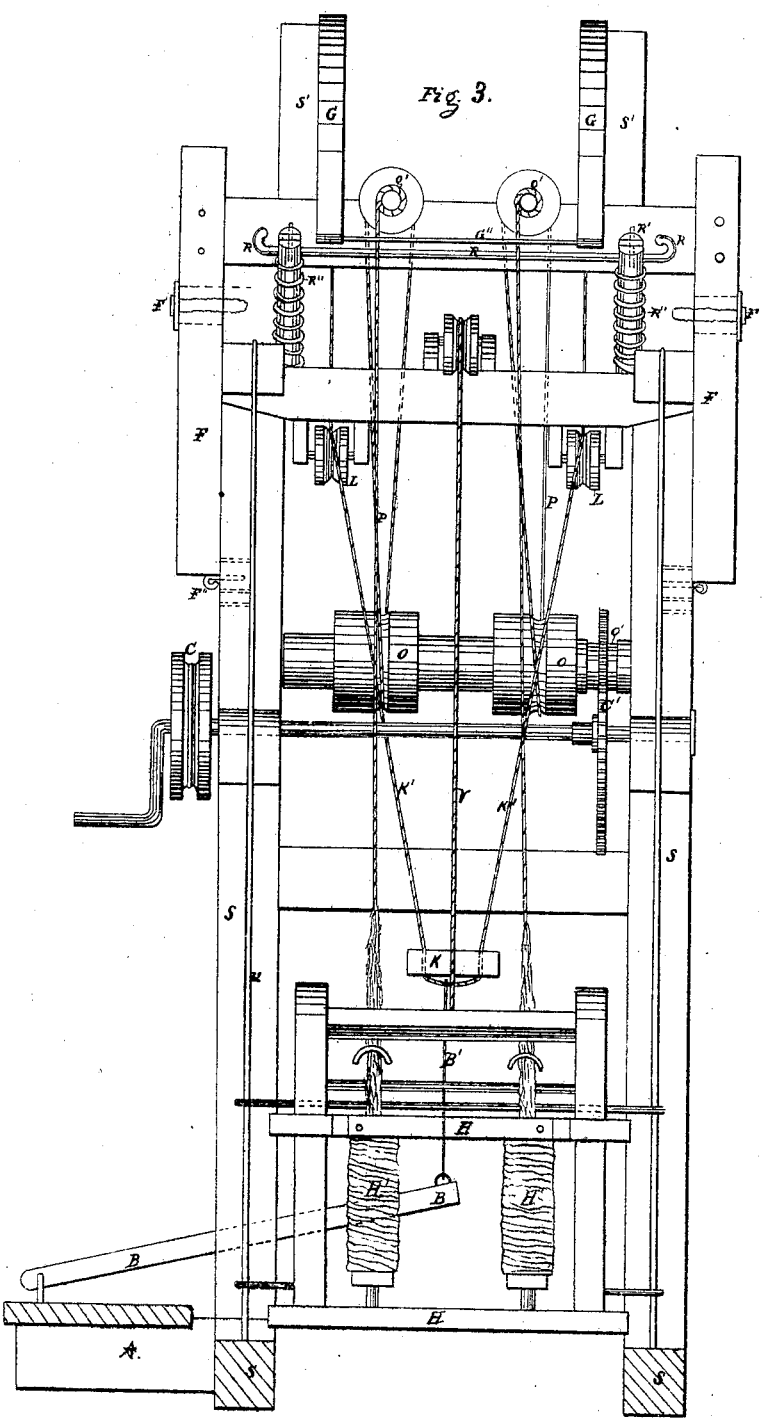

JOHN McCUNE, OF AUBURN, INDIANA.

Letters Patent No. 73,910, dated January 28, 1868.

---

IMPROVEMENT IN SPINNING-MACHINE.

---

The Schedule referred to in these Letters Patent and making part of the same.

---

TO ALL WHOM IT MAY CONCERN:

Be it known that I, JOHN McCUNE, of Auburn, in the county of DeKalb, and State of Indiana, have invented a new and useful Improvement in Spinning-Machines; and I do hereby declare that the following is a full, clear, and exact description of the same, reference being had to the annexed drawings making part of this specification, in which—

Figure 1 is a perspective view.
Figure 2 is a vertical section.
Figure 3, a side elevation.
Figure 4, a spindle, and
Figure 5 another form of spindle.

The same letters, where employed in the several figures, are used in the designation of the same parts.

A is a platform, attached to the frame S, upon which the operator stands. A treadle, B, is fastened to the platform, the oscillating end being supported by cords, B', which latter are carried through the corners of a block, K, and extending upwards are passed over sheaves L, attached to the top of the frame, and then crossing to the opposite side, are secured to the ends of levers G, the fulcra of which are formed by bolts passing into the upper part of the supplementary frame at S'. Spiral springs, $G^1$, are attached to the short end of the levers G, drawing them down, and extending the long arm when relieved from the tension of the cords $B^1$. The levers G are united on each side of the machine by the yarn-guides or followers, $G^2$. Two other rods, R, parallel with the yarn-guides, are placed below them. These rods rest in slots cut in the standards $R^1$, upon spiral springs $R^2$, coiled around the standards. This part of the mechanism I shall call the tension-regulator, and its purpose will be more fully hereinafter explained. C and D are two pulleys on shafts, resting on a cross-piece attached to the frame. These are turned by winches. On the shaft of the pulley C is a spur-wheel, C', which, turning the pinion O', gives motion to the cylinder O. Bands P, passing around the cylinder, drive the spindles Q, which rest on the top of the supplementary frame S, projecting on each side of the cross-piece, terminating near the yarn-guides $G^2$. Rods U, extending from the ends of the cross-pieces $S^2$ to the base of the frame, form an inclined track for the roll-carriers, which are attached thereto by eyes.

This machine is more especially designed to use what is known as the continuous roll. The rolls are wound around the spools $H^1$, the journals of which are so attached to the roll-carriers as to stand vertically, or nearly so, one end turning on a step. The other, passing into a slot, is secured by a pin, as clearly shown in fig. 1. The rolls, being unwound, pass under a roller, $H^2$, and are clamped by a jaw, I, which, turning by hand, shuts against the frame of the roll carried to clamp the roll when the yarn is being spun. The roll-carriers may be raised on the inclined tracks by means of cords, V, carried over pulleys on the frame, and attached to a wheel on the shaft of the pulley D. When thus raised, the jaws I are opened, and the rolls carried between the rod R and the yarn-guide $G^2$, and attached to the spindle Q. The jaw I is now closed, clamping the roll and preventing its further unwinding, leaving enough of the roll above its jaws to form a draught. The two pulleys, C and D, are connected by a cross-belt. In order that they may be independently actuated, the bearing of the shaft of the pulley D is formed at one end in a box, $D^1$, which is attached to the cross-piece of the frame by a shank, allowing it to turn. The other bearing is formed in an elongated eye, $D^2$, which allows that end of the shaft to slide nearer to or further from the pulley C, thereby permitting the band connecting the pulleys to be tightened or loosened at pleasure. A pawl, T, is attached to the shaft of the pulley D, long enough to rest against the frame S when the band is tightened. By this means the pulleys are forced apart when the connecting-belt is to be made tight.

The frame is made in two parts. The upper part, F, is adjustably attached to the lower part by means of a set-screw, $F^1$, and pins, $F^2$, passing through one of a series of holes in the frame S. By raising or depressing the part F of the frame, the tension of the spindle-belts may be regulated at pleasure.

The spindles are constructed as follows: The spindle is placed horizontally in the machine, and it runs upon the bearings, the whirl being in the middle, and a bobbin is carried upon each end of the spindle. I take a piece of wood, about five or six inches long, and drive a piece of three-eighths inch steel through the wood, and then turn down the wood, and the projecting ends of the steel rod, and place a tin tube over the whole, the tubes projecting beyond the ends of the steel rod. Wooden pins are driven into the tin tubes, and turned down to a point concentric with the spindle. A collar is placed on the inner ends of the tubes, the tube-collar and pins forming a bobbin, which may be drawn from the wood and steel centre when filled with yarn. Instead of this form of spindle, one made entirely of steel, as shown in fig. 5, may be used, with a bobbin placed on each end. Any number of spindles may be used. I have shown in the drawings a machine arranged for four threads.

This spinning-machine is operated as follows: The carriers, being at the bottom of the track, raise the pawl T, and loosen the band connecting the wheels C and D; then turn the left-hand crank from left to right to raise the carriers; then push down the pawl T, and the carriers will remain up; then open the jaws and attach the roll to the spindle, allowing enough to pass through the jaw to form a draught, and then close the jaw. Now, turn the right-hand crank in the same manner from left to right, and the spindles will begin to twist the yarn, and the crossed belt will at the same time unwind the cords V, and allow the carriers to descend and draw out the threads. When the carrier has reached the bottom, raise the pawl T, and loosen the crossed belt, and continue to turn the right-hand crank until the thread is sufficiently twisted. To wind up, turn the right-hand crank a little in the opposite direction, and bear down upon the treadle until the yarn-guide $G^2$ presses the thread on to the part of the bobbin where you desire it to commence winding; then turn the right-hand crank, as when twisting, and at the same time turn the left-hand crank to bring up the carriers just as fast as the thread is wound upon the bobbins; and in order to regulate this motion, watch the tension-regulator, which will be pressed upon by the threads, and indicate when the strain is too great or too little. When the twisted thread has been wound up, press down the pawl T, and open the jaws, then raise the pawl and allow the carriers to descend far enough to unwind a sufficient quantity of the roll for another draught, when the operation of twisting is repeated as before.

Having now fully explained the construction and mode of operating my improved spinning-machine, what I claim as my invention, and desire to secure by Letters Patent, is—

1. The double horizontal spindles Q, constructed substantially in the manner set forth.

2. The treadle, the yarn-guides, the tension-regulator, the spindles, and the carriers, constructed and arranged substantially as set forth.

3. The combination of the pulleys C and D, connected by a crossed belt, and the pawl T, for regulating the tension of the belt when the shaft of the elevating-pulley is attached to the frame by adjustable bearings, substantially as set forth.

In testimony whereof, I have signed my name to this specification in the presence of two subscribing witnesses.

JOHN McCUNE.

Witnesses:
CHESTER P. HODGE,
ALEXANDER M. CANON.